United States Patent
Lin

(10) Patent No.: US 6,427,834 B1
(45) Date of Patent: Aug. 6, 2002

(54) STRUCTURE OF ARTIFICIAL FISH BAIT ORGANIZER

(76) Inventor: Po-Hui Lin, No. 9, Lane 96, Sec. 2, Ho-Ping East Road, Taipei (TW)

( * ) Notice: Subject to any disclaimer, the term of this patent is extended or adjusted under 35 U.S.C. 154(b) by 0 days.

(21) Appl. No.: 09/828,790

(22) Filed: Apr. 10, 2001

(51) Int. Cl.[7] ............................................. B65D 85/00
(52) U.S. Cl. ................. 206/315.11; 206/523; 206/593; 43/54.1; 220/528
(58) Field of Search ..................... 206/315.11, 523, 206/593, 521.5, 591, 585, 588–589, 9, 586, 592; 190/109, 110; 43/54.1, 55, 57.1, 4; 224/920, 922; 220/528, 529, 552, 507; D22/134, 136; D3/260, 904

(56) References Cited

U.S. PATENT DOCUMENTS

| | | | | |
|---|---|---|---|---|
| 2,065,234 A | * | 12/1936 | Martinez | 206/315.11 |
| 2,099,003 A | * | 11/1937 | De Witt et al. | 43/57.1 |
| 4,631,856 A | * | 12/1986 | Born | 206/315.11 |
| 4,733,806 A | * | 3/1988 | Sloop | 206/316.2 |
| 4,989,747 A | * | 2/1991 | Demurger | 206/349 |
| 5,271,499 A | * | 12/1993 | Van Horssen | 206/335 |
| 5,505,328 A | * | 4/1996 | Stribiak | 206/315.11 |
| 5,555,671 A | * | 9/1996 | Voight et al. | 206/315.11 |
| 5,829,185 A | * | 11/1998 | Myers | 206/315.11 |
| 6,241,090 B1 | * | 6/2001 | Kaplinsky | 206/315.11 |

* cited by examiner

Primary Examiner—Mickey Yu
Assistant Examiner—Jila M. Mohandesi
(74) Attorney, Agent, or Firm—Rosenberg, Klein & Lee

(57) ABSTRACT

The present invention relates to an improved structure of an artificial fish bait organizer providing a containing box, a supporting frame, and a positioning cushion, and more particularly to a artificial fish bait organizer for neatly arranging the fish bait in position and providing a more convenient way of storing and accessing the artificial baits.

1 Claim, 4 Drawing Sheets

STRUCTURE OF ARTIFICIAL FISH BAIT ORGANIZER

BACKGROUND OF THE INVENTION

1. Field of the Invention

The present invention relates to an improved structure of an artificial fish bait organizer comprising a containing box, a supporting frame, and a positioning cushion, and more particularly to a artificial fish bait organizer for neatly arranging the fish bait in position and providing a more convenient way of storing and accessing the artificial baits.

2. Description of the Related Art

The common fishing tackle organizer generally is a box for holding the fishing line, fishing hooks, fishing floats, fishing leads, artificial baits and lures, and has the function of neatly arranging the fishing tackle and providing a more convenient way of storing and accessing the artificial baits.

Please refer to FIG. 1, which shows a traditional fishing tackle organizer, which is a box (1) comprising an accommodating box (11), and an upper lid (12); wherein the accommodating box further comprising a plurality of compartments (13) in the shape of a rectangle, square, or long grid. It is very inconvenient to store the above-mentioned fishing tackles (especially the artificial baits and lures) into such traditional fishing tackle container. Since the common artificial fishing baits are generally in the form of a fish, or some of them has a fishing hook at their abdomen or tail. Furthermore, there are different sizes of the artificial fishing baits, and the hooks may prick the fisher's fingers, or tear the fisher's cloth if a plurality of artificial fishing baits are put in the fish container at the same time. Additionally, if many artificial baits are put in the fishing container at the same time, it may damage or break the fishing hooks at the abdomen and tail of the artificial fishing bait.

In view of above shortcomings of the traditional fishing tackle that awaits to be improved, and in order to provide a more convenient way of storing and accessing the fishing tackle, the present inventor actively performed research and development in this area and expected to provide a more practical product for user's choice, and hence invents the present invention.

SUMMARY OF THE INVENTION

The primary objective of the present invention is to provide an improved structure of an artificial fish bait organizer, and more particularly to an artificial fish bait organizer for neatly arranging the artificial fish bait in position, and providing a more convenient way of storing and accessing the artificial baits.

To make it easier for our examiner to understand the objective of the invention, its structure, innovative features, and its performance, we use a preferred embodiment together with the attached drawings for the detailed description of the invention.

BRIEF DESCRIPTION OF THE DRAWINGS

Other objects, features, and advantages of the invention will become apparent from the following detailed description of the preferred but non-limiting embodiment. The description is made with reference to the accompanying drawings, in which.

DETAILED DESCRIPTION OF THE PREFERRED EMBODIMENTS

Figure 1:
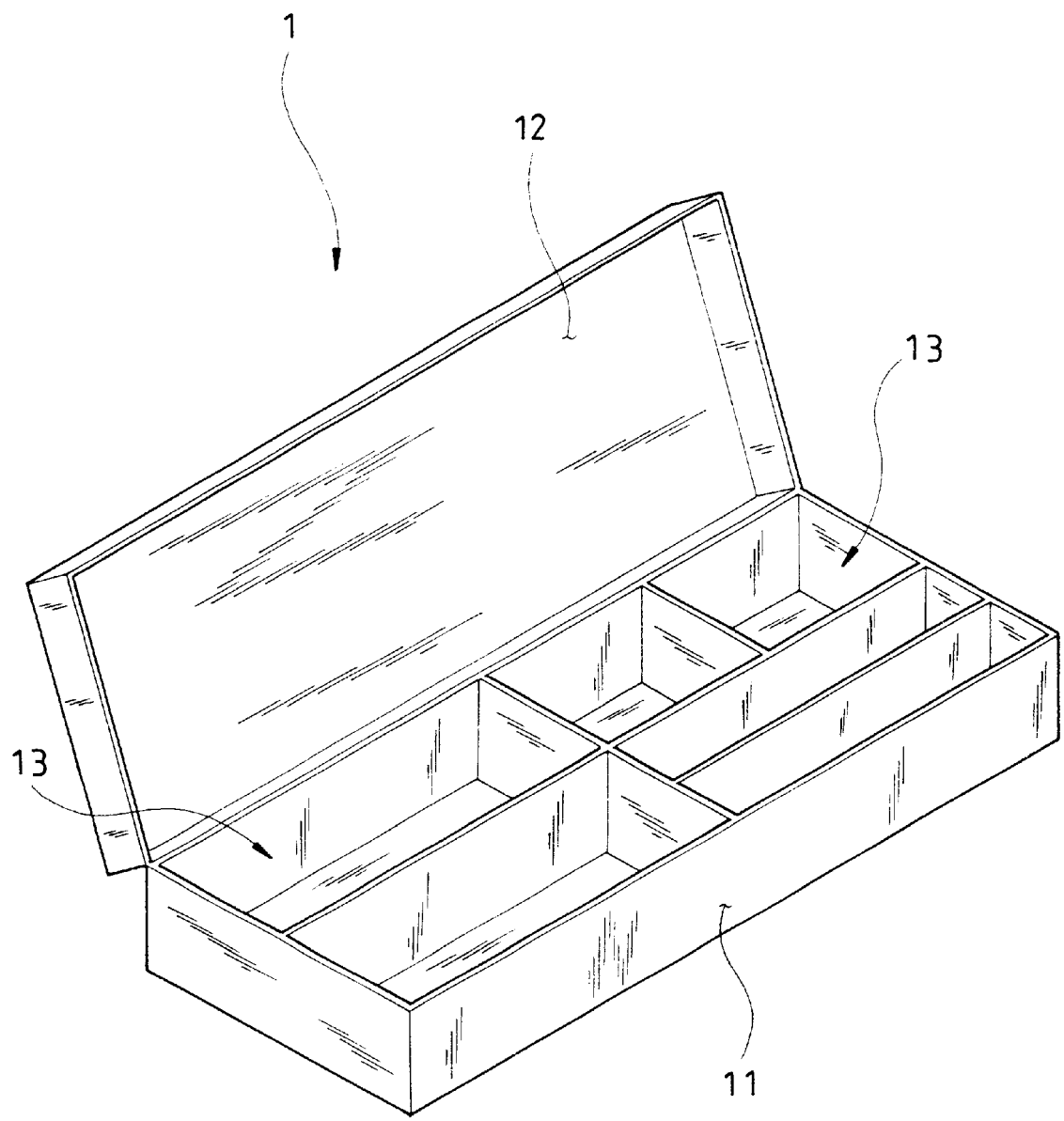
FIG. 1 shows the structure of a prior-art fishing box.
Figure 2:
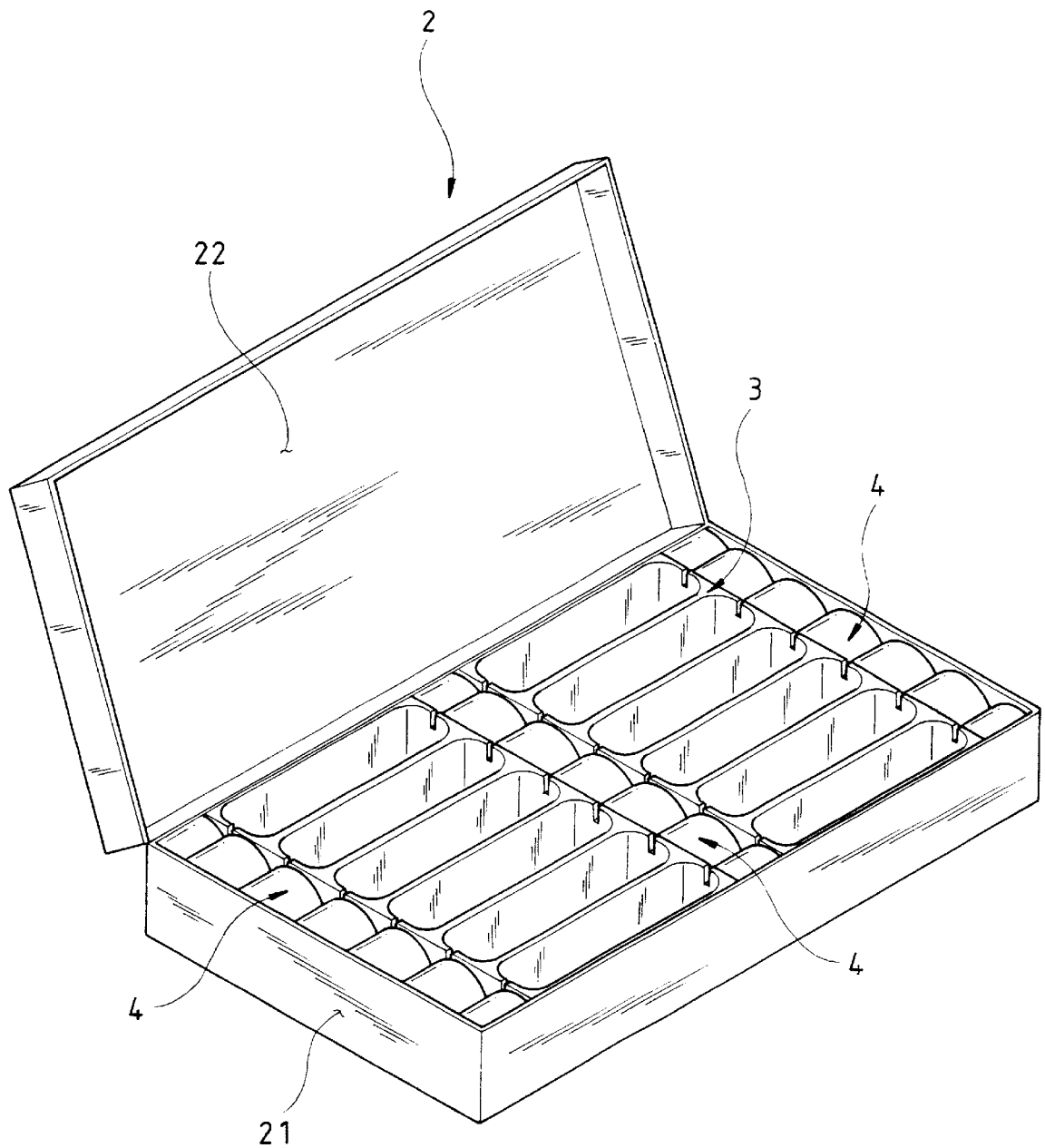
FIG. 2 shows the assembled structure of a preferred embodiment of the present invention.
Figure 3:
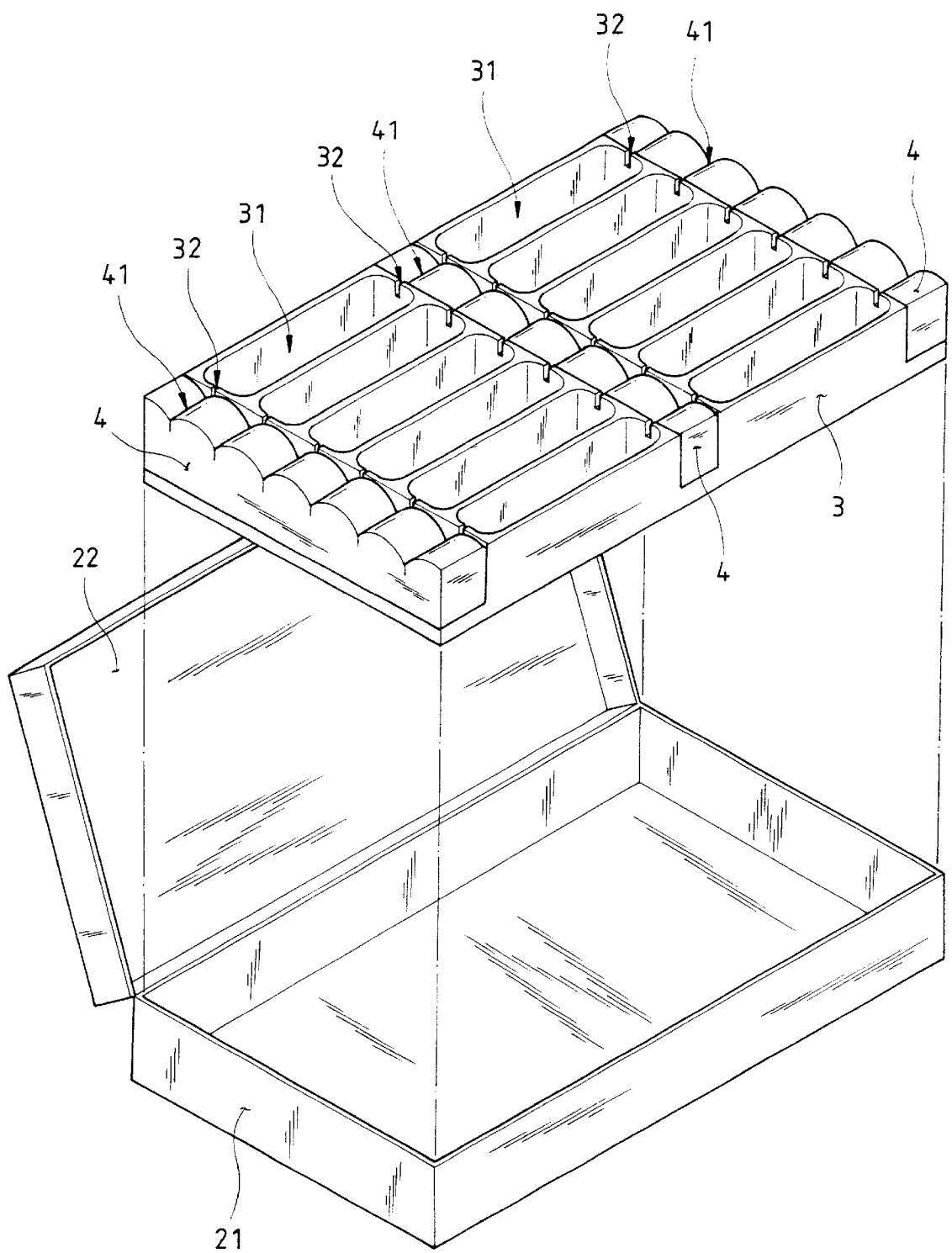
FIG. 3 shows the disassembled parts of a preferred embodiment according to the present invention.

Please refer to FIGS. 1 and 2. An improved structure of the artificial fishing bait organizer mainly comprises an accommodating box (2), a supporting frame (3), and a positioning cushion (4), wherein:

the accommodating box (2) is an injected integral part made of plastic material substantially in the shape of a flat rectangular box, and a rectangular accommodating frame (21) being disposed at the lower section of the accommodating box (2), and a rectangular upper lid (22) being disposed at the corresponding upper section of the accommodating box (2);

the supporting frame (3) is an injected integral part made of plastic material substantially in the shape of rectangular frame body, and a plurality of accommodation grooves (31) are disposed in such supporting frame (3), and a positioning groove (32) being embedded into each upper edge of both ends;

the positioning cushion (4) substantially in the shape of a long bar, having a wave-shape curved member at its top; a latching groove (41) being disposed in the middle between two curved members, and said latching groove (41) is disposed in corresponding to the positioning groove (32) at the upper edge on both ends of the accommodating groove (31) of the supporting frame (3), and a positioning cushion (4) being coupled to each end of the accommodating groove (31) of the supporting frame (3); wherein an integral artificial fishing bait organizer is formed by means of disposing the supporting frame (3) into the accommodating frame (21) of the accommodating box (2).

Figure 4:
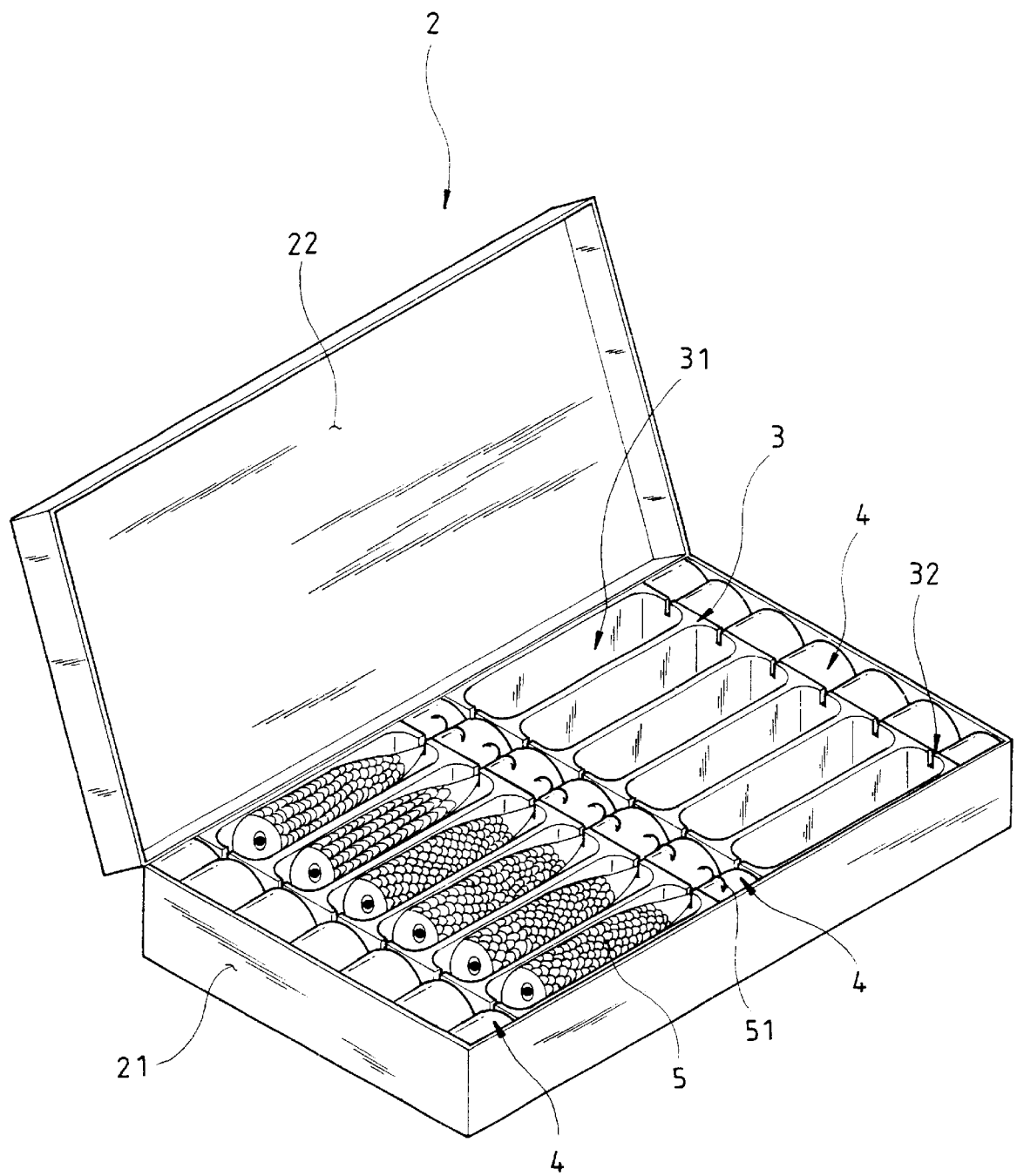
FIG. 4 shows a preferred embodiment of the present invention when it is in use.

Please refer to FIG. 4. The supporting frame (3) of the present invention comprises a plurality of accommodating grooves (31), and the artificial baits and lures are put into the accommodating groove (31), and the artificial bait (4) having a fishing hook (51) at its abdomen or tail, and at least a fishing hook (51) at one end passing through the positioning groove (32) at the upper edge on both ends of the accommodating groove (31) of the supporting frame (3), and further being hooked into the latching groove (41) of the positioning cushion (4). The figures obviously show that the present invention provides a neat function for positioning the fishing hook (51) of the artificial bait (5), and the fishing hook can be secured to the latching groove (41) of the positioning cushion (4), thereby offers a convenient way for accessing the artificial fishing bait (5).

In summation of the above description, the structure of the present invention definitely attains the expected result and effect, enhances the performance of the conventional structure, and further complies with the patent application requirements and it is submitted to the Patent and Trademark Officefor review and granting of the commensurate patent rights.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. An improved structure of artificial fish bait organizer, comprising an accommodating box, a supporting frame, and positioning cushions; wherein:

the accommodating box is an injected integral part made of plastic material substantially in the shape of a flat rectangular box, and comprising of a lower rectangular accommodating frame and an upper rectangular lid being disposed at an upper section of the rectangular accommodating box;

the supporting frame is an injected integral part made of plastic material substantially in the shape of a rectangular frame body, and a plurality of accommodating grooves are disposed in said supporting frame, and a positioning groove being embedded into each upper edge of both ends of each accommodating groove of the supporting frame; and each positioning cushion substantially in the shape of a long bar, having a plurality of curve members at its top; latching grooves each being disposed in the middle between two of the curved members, and each said latching groove is disposed in corresponding to the positioning groove at the upper edge on both ends of the accommodating groove of the supporting frame, and a positioning cushion being coupled to each end of the accommodating groove of the supporting frame; wherein an integral artificial fishing bait organizer is formed by disposing the supporting frame into the rectangular accommodating frame of the accommodating box.

* * * * *